(12) United States Patent
Tkebuchava (10) Patent No.: US 8,479,883 B2
(45) Date of Patent: Jul. 9, 2013

(54) RAPPELLING SYSTEM

(76) Inventor: Tengiz Tkebuchava, Newton, MA (US)

( * ) Notice: Subject to any disclaimer, the term of this patent is extended or adjusted under 35 U.S.C. 154(b) by 718 days.

(21) Appl. No.: 12/542,864

(22) Filed: Aug. 18, 2009

(65) Prior Publication Data
US 2010/0044156 A1  Feb. 25, 2010

Related U.S. Application Data

(60) Provisional application No. 61/090,370, filed on Aug. 20, 2008.

(51) Int. Cl.
*A62B 1/06* (2006.01)
(52) U.S. Cl.
USPC .................. 182/129; 182/3; 182/4; 182/231
(58) Field of Classification Search
USPC .......................................... 182/3, 4, 129, 231
See application file for complete search history.

(56) References Cited

U.S. PATENT DOCUMENTS

| | | | | |
|---|---|---|---|---|
| 119,997 | A * | 10/1871 | Rice | 188/65.5 |
| 1,169,760 | A * | 2/1916 | Barrett | 182/6 |
| 1,212,301 | A * | 1/1917 | Wick | 182/6 |
| 2,700,781 | A * | 2/1955 | Smith | 441/83 |
| 2,738,939 | A * | 3/1956 | Johnson | 244/137.2 |
| 2,953,330 | A * | 9/1960 | Lysak | 244/118.1 |
| 3,765,770 | A * | 10/1973 | McConnell et al. | 356/141.3 |
| 3,850,262 | A * | 11/1974 | Simizu | 182/239 |
| 3,918,172 | A * | 11/1975 | Moreau | 356/4.08 |
| 3,967,232 | A * | 6/1976 | Mills et al. | 367/4 |
| 4,203,665 | A * | 5/1980 | Boulais | 356/4.08 |
| 4,515,240 | A * | 5/1985 | Curtis | 182/6 |
| 4,538,704 | A * | 9/1985 | Forrest | 182/10 |
| 4,588,046 | A * | 5/1986 | van der Neer et al. | 182/236 |
| 4,667,772 | A * | 5/1987 | Kammerer | 182/6 |
| 4,673,059 | A * | 6/1987 | Kurtgis | 182/3 |
| 4,674,599 | A * | 6/1987 | Nelson | 182/231 |
| 5,020,742 | A * | 6/1991 | Haslim | 244/137.2 |
| 5,423,398 | A | 6/1995 | Brown | |
| 5,581,901 | A * | 12/1996 | Takahashi | 33/756 |

(Continued)

FOREIGN PATENT DOCUMENTS

| | | |
|---|---|---|
| JP | 06144390 A | 5/1994 |
| JP | 2003077334 A | 3/2003 |
| WO | WO2005078545 A1 | 8/2005 |

*Primary Examiner* — Alvin Chin Shue
*Assistant Examiner* — Colleen M Chavchavadze
(74) *Attorney, Agent, or Firm* — AKC Patents LLC; Aliki K. Collins (57) ABSTRACT

An improved rappelling system for raising or lowering a person or an object to or from a stationary or moving elevated point includes at least one cable for supporting a person or an object, a motor attached to the elevated point and coupled to the cable so that the motor propels the cable up or down and thereby raises or lower the person or object, respectively, a controller/processor for controlling the motion of the motor and at least one sensor attached to the elevated point and coupled to the controller/processor. The sensor measures the distance of the elevated point from a target area located at a lower point than the elevated point and continuously sends a feedback signal to the controller/processor. The feedback signal is used to calculate and adjust in real-time motor control parameters that determine speed and landing location of the person or object relative to the target area. The system also includes a display attached to the elevated point and displaying the measured distance and the motor control parameters in real-time.

23 Claims, 5 Drawing Sheets

U.S. PATENT DOCUMENTS

| | | |
|---|---|---|
| 5,788,186 A * | 8/1998 | White .................. 244/137.4 |
| 6,367,583 B1 * | 4/2002 | Derby .......................... 182/3 |
| 6,515,737 B2 * | 2/2003 | Perry ........................ 356/5.04 |
| 6,738,314 B1 * | 5/2004 | Teeter et al. ................ 367/131 |
| 6,915,201 B1 | 7/2005 | Ott |
| 7,261,278 B2 | 8/2007 | Ball |
| 7,597,175 B2 * | 10/2009 | Reed ........................ 182/145 |
| 2003/0106742 A1 | 6/2003 | Shechter |
| 2004/0065508 A1 | 4/2004 | Avots |
| 2005/0098383 A1 | 5/2005 | Halevy |
| 2005/0211504 A1 | 9/2005 | Arthur |
| 2005/0230527 A1 * | 10/2005 | Silansky et al. .............. 244/30 |
| 2005/0269475 A1 * | 12/2005 | Parker ........................ 248/317 |
| 2006/0065485 A1 * | 3/2006 | Reed ............................ 182/82 |
| 2008/0087497 A1 | 4/2008 | Boswell |
| 2008/0217102 A1 * | 9/2008 | Armstrong .................... 182/5 |
| 2009/0014242 A1 * | 1/2009 | Tang ........................... 182/241 |
| 2009/0078505 A1 * | 3/2009 | Casebolt et al. ............ 182/231 |
| 2009/0146010 A1 | 6/2009 | Cohen |
| 2010/0044156 A1 * | 2/2010 | Tkebuchava ................ 182/231 |
| 2010/0130108 A1 * | 5/2010 | Mann ............................ 451/75 |

* cited by examiner

RAPPELLING SYSTEM

CROSS REFERENCE TO RELATED CO-PENDING APPLICATIONS

This application claims the benefit of U.S. provisional application Ser. No. 61/090,370 filed on Aug. 20, 2008 and entitled IMPROVED RAPPELLING MECHANISM, which is commonly assigned, and the contents of which are expressly incorporated herein by reference.

FIELD OF THE INVENTION

The present invention relates to an improved rappelling system and in particular to a mechanism for moving an object or a person from an elevated position to a lower position or the reverse with controlled speed and improved accuracy of the landing location.

BACKGROUND OF THE INVENTION

Rappelling refers to a process of descending a vertical surface, such as a cliff or a wall, by sliding down a belayed rope or through a device that provides friction, typically while facing the surface and performing short backward leaps to control the descent. A rope may also be used for jumping from a helicopter, a tall building or any other elevated position to a lower position or for transporting an object from an elevated position to a lower position.

Traditional rappelling techniques require extensive knowledge and training in executing descending techniques. The Interagency Helicopter Rappel Guide 2006 published at the following link (http://amd.nbc.gov/library/handbooks/ihrg-.pdf) includes over 50 pages in technique, equipment and procedural information. The latest technological innovation allows only for four ropes and does not provide any degree of safety based on information relayed to the unit, (http://ecms-gmbh.de/EAD01.htm). In extreme situations, such as jumping from a helicopter in combat situations or escaping from a burning vessel or building, slow descending or ascending may jeopardize the life of the jumping person and potentially place the helicopter and its occupants in danger.

Paratroopers jumping from a helicopter with equipment weighting more then their own body weight have a greater potential for weak exits. Weak exits induce tumbling, rolling, and spinning immediately outside the paratroop door. Prevention of weak exits and proper execution of the current exit standards supports safe operations.

Accordingly, there is a need for an improved rappelling mechanism that prevents weak exits and does not require extensive training of the people using it.

SUMMARY OF THE INVENTION

In general, in one aspect, the invention features an improved rappelling system for raising or lowering a person or an object to or from a stationary or moving elevated point. The rappelling system includes at least one cable for supporting a person or an object, a motor attached to the elevated point and coupled to the cable so that the motor propels the cable up or down and thereby raises or lower the person or object, respectively, a controller/processor for controlling the motion of the motor and at least one sensor attached to the elevated point and coupled to the controller/processor. The sensor measures the distance of the elevated point from a target area located at a lower point than the elevated point and continuously sends a feedback signal to the controller/processor. The feedback signal includes the measured distance and is used to calculate and adjust in real-time motor control parameters that determine speed and landing location of the person or object relative to the target area. The system also includes a display attached to the elevated point and coupled to the controller/processor. The measured distance and motor control parameters are displayed in real-time in the display.

Implementations of this aspect of the invention may include one or more of the following features. The cable includes a foot stirrup and the foot stirrup is controlled by a self-adjusting mechanism that grasps a person's foot upon applying pressure and releases the person's foot upon removing the applied pressure. The cable further includes a hand loop and first and second handles located about five feet above the foot stirrup. The cable is made of heat resistant fibers. The cable is made of Kevlar™ material, metal, composites, nano-materials, phase change material or bulletproof materials, among others. A detector may be attached to the lower end of the cable, and the detector is configured to detect at least one of explosives, smoke, radiation, or chemicals and to provide light. The cable may be delivered under an angle relative to the elevated point. The cable has a structure allowing cable motion only on an X-Y plane defined by a longitudinal cable axis and a horizontal target axis and preventing motion on the corresponding X-Z and Y-Z planes that are perpendicular to the X-Y plane. In the case where the target area is a water surface of a water body, the sensor further measures the distance of the elevated point to the water surface and the depth of the water body. The sensor further measures wind, temperature, humidity, precipitation, or visibility. The motor slows down as the person or object approaches the target area and comes to a complete stop about two feet from the desired landing location within the target area. In cases where the elevated point is a moving aircraft, the display is attached at the top of an exit opening of the aircraft. The system may further include remote activation means for the motor. The system may further include an alarm indicating a system malfunction.

In general, in another aspect, the invention features an improved rappelling method for raising or lowering a person or an object to or from a stationary or moving elevated point. The method includes the following. Supporting a person or an object upon at least one cable. Attaching a motor to the elevated point and coupling it to the cable so that the motor propels the cable up or down and thereby raises or lowers the person or object, respectively. Controlling the motion of the motor with a controller/processor. Attaching at least one sensor to the elevated point and coupling it to the controller/processor. Measuring the distance of the elevated point from a target area located at a lower point than the elevated point with the sensor. Sending a feedback signal from the sensor to the controller/processor continuously. The feedback signal includes the measured distance. Using the feedback signal to calculate and adjust in real-time motor control parameters that determine speed, and landing location of the person or object relative to the target area. Attaching a display to the elevated point and coupling it to the controller/processor and displaying the measured distance and motor control parameter in real-time in the display.

Among the implementations and advantages of this invention may be one or more of the following. The present rappelling system enables fast and safe deployment of people and object from flying vessels or buildings. It guarantees the escape of occupants from an aircraft after a crash landing where the exit may be located some distance from the ground. Military use includes deployment of troops from helicopters. The deployment is safer and quicker, especially important in hostile territory. Divers may also be faster deployed from a hovering helicopter in rescue missions thereby providing additional time in saving lives. Other uses for equipment of this nature are for emergency escape from buildings and construction cranes, for lowering loads to inaccessible places from a hovering helicopter, or for rapid delivery of rescue or fire fighting personnel and equipment from a helicopter at the scene of an aircraft accident while the helicopter remains hovering to direct operations or to divert flames with the rotor downwash. Large skyscrapers may have the system installed at interval stations to allow for safe exit to individuals who otherwise would not have an alternative escape rout.

The details of one or more embodiments of the invention are set forth in the accompanying drawings and description below. Other features, objects and advantages of the invention will be apparent from the following description of the preferred embodiments, the drawings and from the claims.

BRIEF DESCRIPTION OF THE DRAWINGS

Referring to the figures, wherein like numerals represent like parts throughout the several views.

DETAILED DESCRIPTION OF THE INVENTION

Figure 4:
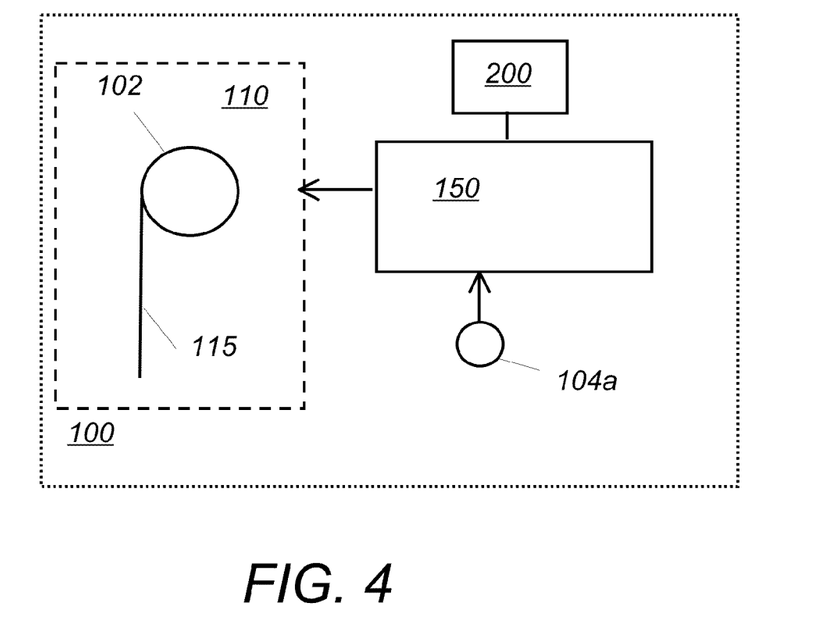
FIG. 4 is a schematic diagram of the components of the improved rappelling system.

Referring to FIG. 4, the improved rappelling system 100 includes a computing processor 150 receiving continuously feedback signals from one or more sensors 104a-104d and based on these feedback signals controlling and continuously adjusting the speed of a rappelling device 110. Rappelling device 110 includes a motor 102 and a cable/rope 115 that is propelled by the motor 102. The system also includes a display 200 that depicts the measured parameters and calculated speed.

Figure 1:
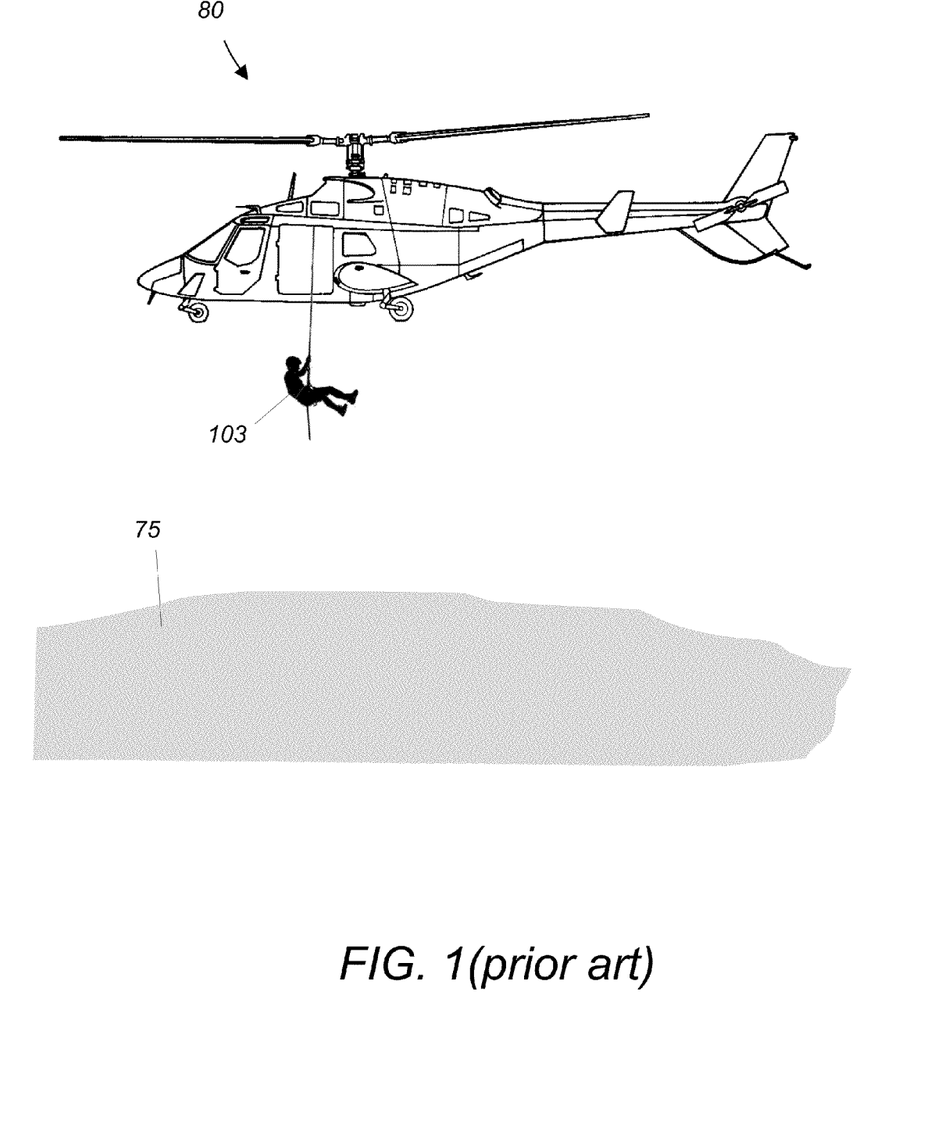
FIG. 1 depicts a paratrooper descending from a helicopter.
Figure 2A:
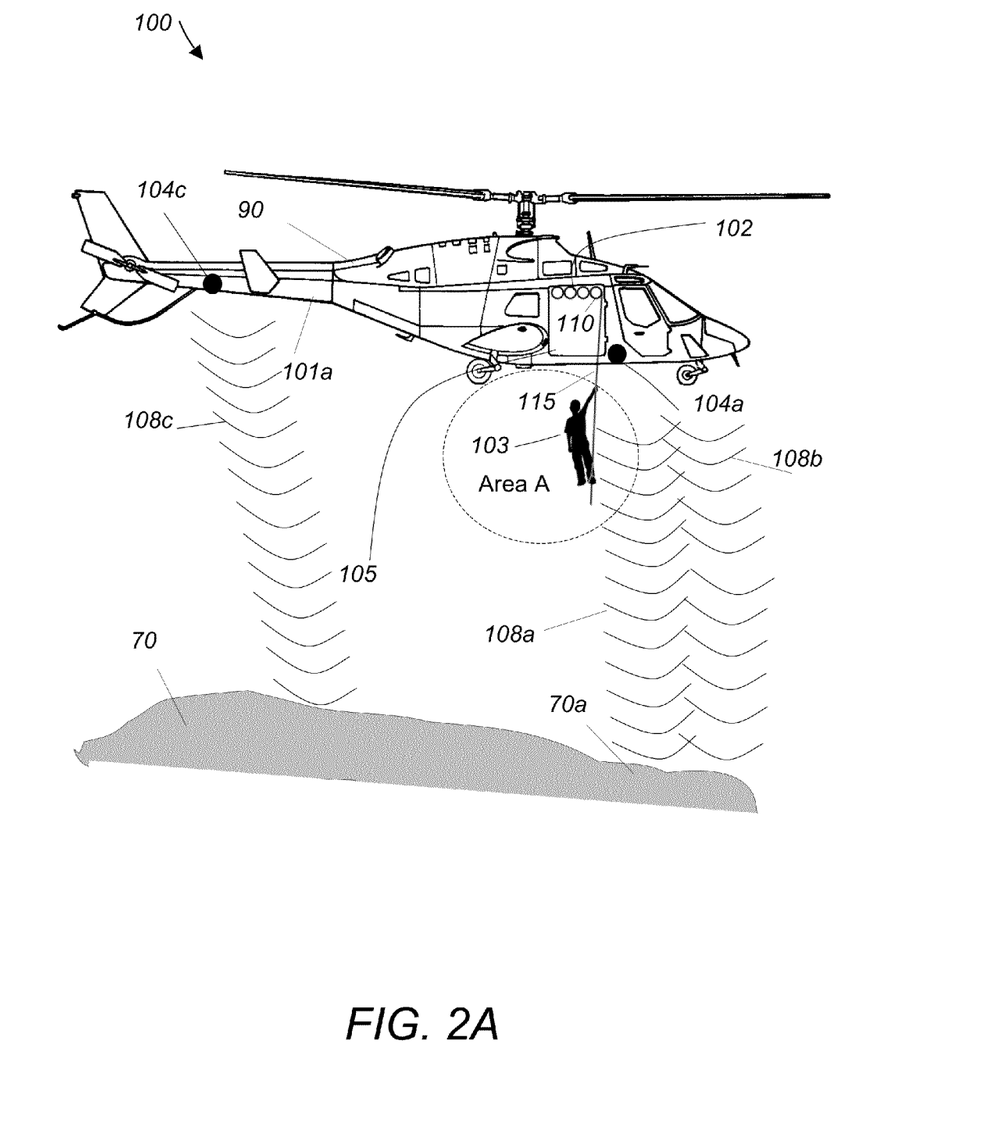
FIG. 2A-2B depict schematic diagrams of the improved descending system according to this invention.
Figure 2B:
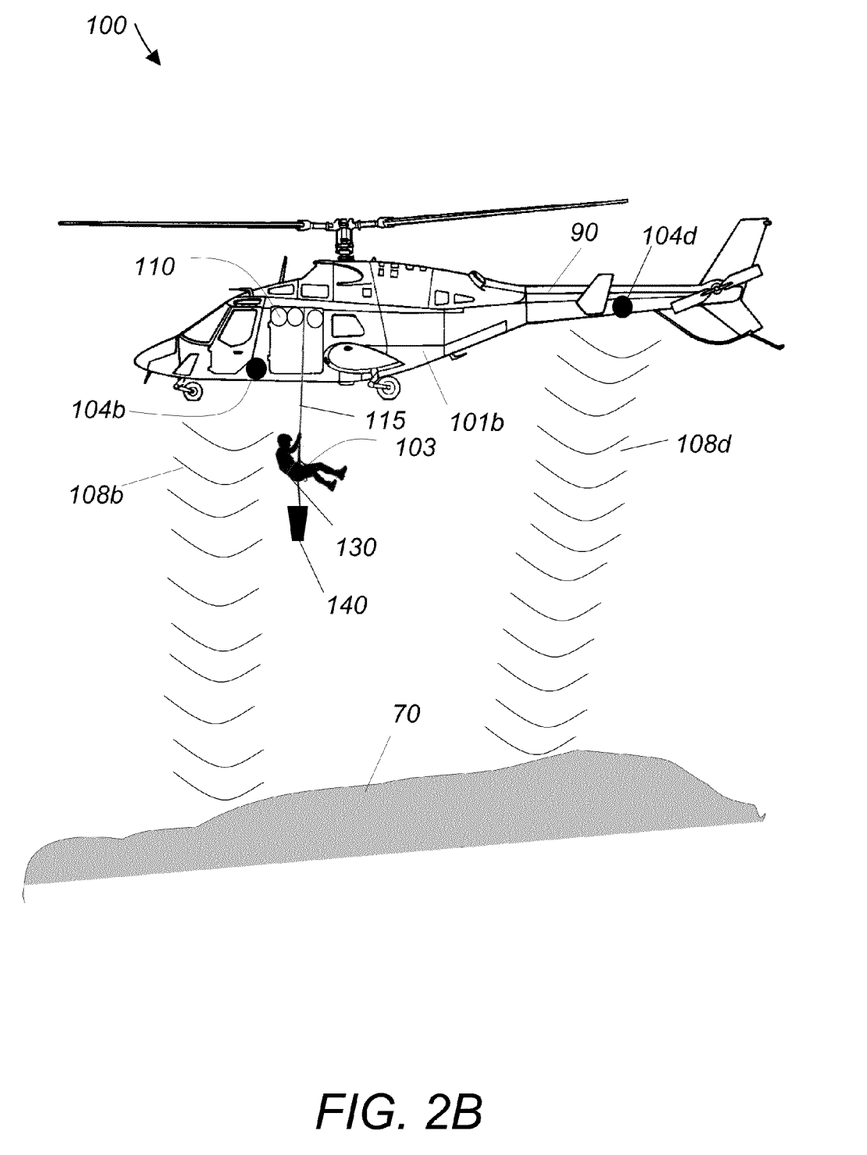

Referring to FIG. 2A, the improved rappel device 110 is installed above the exit door 105 of the helicopter 90 or fastened above a skyscraper window or exit area. There are four units 110 on side 101a of the helicopter (shown in FIG. 2A) and three units 110 on side 101b of the helicopter 90 (shown in FIG. 2B). In other embodiments, there may be five or more units from each side of the flying vessel. Each device 110 houses a rope 115 of a certain length, which is wrapped around a small but very powerful motor 102. The rope 115 is made of strong heat resistant fibers. In one example, the rope fibers comprise Kevlar™ material. Other examples of the rope fibers include heat resistant metal, composite materials, nano-materials, or other bulletproof materials. In yet other embodiments the rope is made of phase change materials (PCM), which change phase in response to temperature, chemicals, electricity or light. PCM materials may become soft, so that they can be bent and then hardened in order for the rope to be delivered under an angle relative to the building or flying vessel. In another embodiment, the cable 115 includes pieces 115a linked together as in a bicycle chain, shown in FIG. 2D. This bicycle chain cable structure allows the cable to swing in the X-Y plane along direction 116a and prevents motion in the X-Y plane (along 117a) and Y-Z plane. This type of cable structure minimizes swinging of the cable 115 during decent and or ascent. In other embodiments, the end of the cable 115 is equipped with a detector 140 that can detect explosives, smoke, radiation, chemicals and provide light.

Figure 2C:
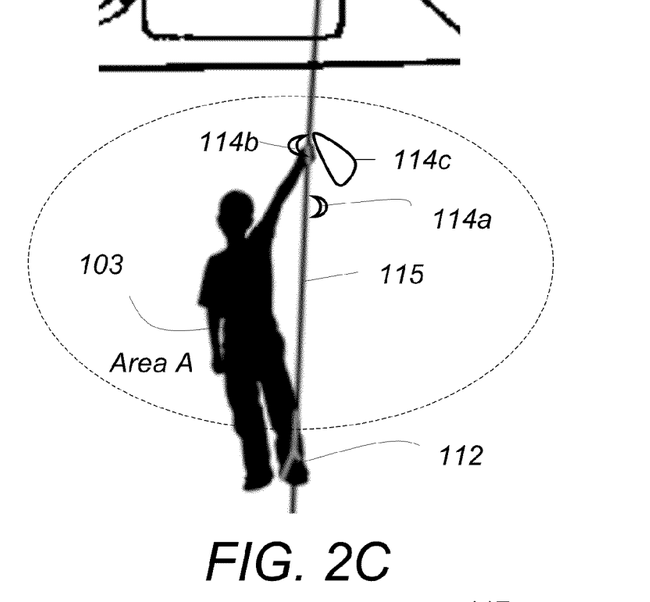
FIG. 2C depicts a detailed view of area A of FIG. 2A.
Figure 2D:
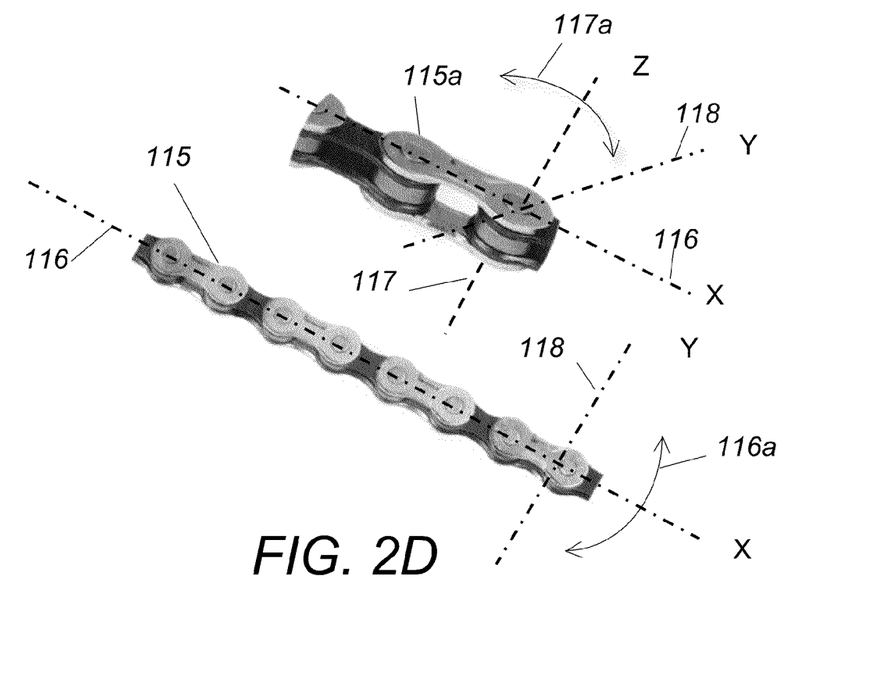
FIG. 2D depicts a detailed view of the cable 115 of FIG. 2A.

Referring to FIG. 2C, the bottom tip of each rope 115 is equipped with a foot-stirrup 112 that is controlled by a self-adjusting motor-less mechanism grasping the foot upon weight/pressure and loosening upon release of pressure. Approximately five feet above the stirrup 112 there is a loop 114c and/or two hand loops 114a, 114b, parallel from each other and one foot apart providing additional security and stability during the descent/ascent of the passenger 103. In operation, passenger/jumper 103 pulls the rope, inserts his foot into the stirrup 112 and slips his left or right hand into the loop 114c or loop 114a and jumps down.

The movement of the rope 115, its speed and transport length, are controlled by controller/processor 150. Processor 150 receives feedback signals 108a, 108b, 108c, 108d from sensors 104a, 104b, 104c, 104d, respectively, which measure the altitude, wind, water depth and distance of the helicopter from the landing target 70. Sensors 104a, 104b are mounted in the front bottom sides of the helicopter 101a, 101b, respectively. Sensors 104c, 104d are mounted in the back bottom sides of the helicopter 101a, 101b, respectively. In other embodiments, sensors 104a-104d are mounted next to the rope housing on the building or the exit 105. These sensor positions allow the processor 150 to calculate the distance to a target spot 70a precisely by measuring the distance via three projections 108a, 108b, 108c vertically and from the bottom of the helicopter. Based on the calculated data, the processor 150 generates a 3-dimensional view of the target area 70 and accordingly controls the motion of the motor 102 and provides suggestions as to what action needs to be taken, i.e., start descent/ascent, hold descent/ascent, optimal height for descent/ascent, among others. The sensor information is continuously fed to the processor and the processor continuously and in real time controls the ascent/descent of the jumper 103. Examples of the sensors 104a, 104b, 104c, 104d include a global positioning system (GPS), radar, and sonar, among others. In other embodiments, the sensors are designed to also measure environmental parameters including temperature, humidity, visibility, precipitation, wind, among others.

Both the descent and ascent are extremely rapid. Upon approaching the landing target 70 the motor 102 slows down and the passenger 103 comes to a complete and safe stop approximately 2 feet from the target 70. The landing targets may be stable ground, moving water vessel, train or moving car. The passenger/jumper 103 does not need to adjust for these scenarios as the instant real-time communication between the sensors 104a, 104b and processor 150 does that automatically. The sensitivity of device 110 allows for accurate landing even during poor visibility due to fog, smoke, darkness, or soft soil, among others. Similarly, during the ascent, upon reaching the landing area, the motor 102 slows down and the passenger comes to a complete stop in front of the landing area. Motors 102 are controlled independently from each other and from the helicopter main engine. Motors 102 are activated by the main engine but switch to autonomic operation, if necessary. This is the case when the flying vessel is in fire or almost destroyed in a combat situation, thereby allowing the pilot to escape from the falling machine. The computerized system 100 controls the descent speed and height, and adjusts the pilot's safe landing in spite of the constantly changing situation, i.e., non-steered tumbling helicopter. Each of these units has its own battery with a wireless recharging capability. The battery can also recharge itself by means of the moving rope during the descent.

Figure 3:
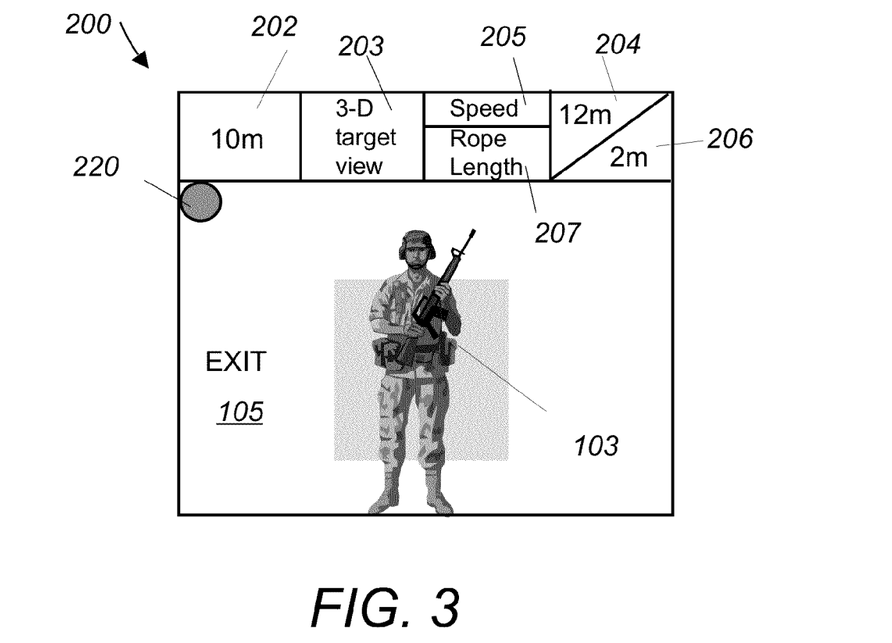
FIG. 3 depicts a monitor over the helicopter door showing the measured distance from the landing spot.

On board the system 100 provides and displays all necessary information to the passenger/jumper 103 before the exit allowing for better preparedness. The information is displayed in display 200, which is mounted close to the processor 150 or at the exit door 105, as shown in FIG. 3. The displayed information includes in addition to the above mentioned 3-dimensional view of the target area 203, the distance to target 202, decent/ascent speed 205 and rope length 207, among others. For water based targets, the passenger/jumper can instruct the device 100 to allow him/her to completely or partially submerge before exiting the rope. The sensor information also provides the passenger with distance to the water surface 204 and exact depth of the water target 206. This information is especially critical during flood victim rescue. The system also includes an alarm 220 indicating a malfunction in any of the motor units, main engine or rope. The alarm could lock the failing unit or system 100, so that it is unoperable.

The information is displayed in monitor 200 and is easily viewed by both the helicopter pilot and the jumper 103 prior to the decent. This instant visual feedback for the pilot is advantageous because it does not require a separate person functioning as a spotter. Upon a complete descent and exit of the passenger the device returns the rope immediately to its housing within seconds, entering the standby mode for the next passenger. The device can be remotely activated to keep the rope suspended and wait for the passenger to provide fast ascent. It can also be activated to lower automatically to pick up a passenger below. This can be especially beneficial to fire rescue personnel who can activate the skyscraper device systems below to access higher points in order to extinguish fires, or rescue individuals or other living or non-living objects.

In other embodiments, system 100 is a portable system that can be easily mounted at the helicopter exit door 105 or other locations for temporary or long-term use. Other locations/situations where system 100 can be installed and used include construction places, suspension cabin of the cable railway, evacuation from a big ship, offshore oil platforms, truck for rescue operation or a safety control during a sport descent into a canyon, emergency rescue descent into a crevasse, after mounting a portable system on the scene of the accident, speed control for beginners while skiing, speedy rescue of injured mountaineers, speleologists or tourists, or it can be fixed at a desired spot for efficient use in antiterrorism operations. In yet other embodiments, the jumper 103 is supported on a seat 130 attached to the rope 115, as shown in FIG. 2B.

Among the advantages of this invention may be one or more of the following. The delivery of paratroopers/passengers is extremely fast (of the order of a few seconds). The jumper doesn't need a special training. This type of evacuation is faster than a helicopter landing or both the pilot and passengers. Accurate radar and sonar sensors provide feedback signals for full control of the descent and ascent parameters. Passengers can escape the crash in case of engine problems, accidents, fighting, wind, or other problematic situations. Several people from both sides can be evacuated simultaneously. At night, a jumper doesn't need to watch the ground below and the distance to it, because the device measures the distance in any weather condition and guarantees a fast and smooth landing. Two jumpers can hold a heavy or long cargo and quickly deliver it down or lift it up to the helicopter. Two rescuers can also hold a wounded person and lift him up. In combat situation a jumping soldier can fire a gun with his free hand during the jump. A firefighter can use his free hand for the hose or anything he needs in an extreme situation. In an alleged ambush or active combat situation, 2 or 3 paratroopers can jump with a bulletproof shield and after landing they can use this protection. The next jumpers can land directly behind this shield while a laser beam confirms the destination spot. The invention enables fast and precise landing on moving targets, i.e., boats (even in the stormy ocean), moving car or train, among others. The system provides autonomous operation, i.e., each delivery device will work independently from the helicopter's engine and from each other. Thus in case of fire or engine problems the delivery device(s) are still able to operate. This landing technique enables quick release of the paratrooper or firefighters He just needs to remove his foot and hand thus being ready for immediate action as soon as the landing has taken place. The device can also be used for exterior evacuation from buildings. Since parachutes cannot be used in low flying circumstances, the occupants are always doomed to death. However, this novel system is the first design providing the chance to survive.

Several embodiments of the present invention have been described. Nevertheless, it will be understood that various modifications may be made without departing from the spirit and scope of the invention. Accordingly, other embodiments are within the scope of the following claims.

What is claimed is:

1. An improved rappelling system for raising or lowering a person or an object to or from a moving helicopter comprising:
   a single cable for supporting a person or an object, wherein said cable comprises a detector attached to its lower end;
   a motor attached to said helicopter and coupled to said cable so that said motor propels said cable up or down and thereby raises or lower said person or object, respectively;
   a controller for controlling the motion of said motor;
   at least three sensors attached to three different locations of the helicopter, respectively, and being coupled to said controller, wherein said three sensors measure the distances of said three different location of the helicopter—from three different locations in a target area located at a lower point than said helicopter and continuously send feedback signals to said controller and wherein said feedback signals comprise said measured distances and are used to generate a three-dimensional view of the target area and to calculate and adjust in real-time motor control parameters that determine speed and landing location of said person or object relative to said target area; and
   a display coupled to said controller for displaying said measured distances, said three-dimensional view of the target area and said calculated motor control parameters in real-time.

2. The system of claim 1 wherein said cable comprises a foot stirrup and wherein said foot stirrup is controlled by a self adjusting mechanism that grasps a person's foot upon applying pressure and releases the person's foot upon removing the applied pressure.

3. The system of claim 2 wherein said cable further comprises a hand loop and first and second handles located about five feet above said foot stirrup.

4. The system of claim 1 wherein said cable comprises heat resistant fibers and wherein said heat resistant fibers comprise Kevlar™ material, metal, composites, nano-materials, phase change material or bullet proof materials.

5. The system of claim 1 wherein said cable comprises a structure allowing cable motion only on an X-Y plane defined by a longitudinal cable axis and a horizontal target axis and preventing motion on the corresponding X-Z and Y-Z planes that are perpendicular to the X-Y plane.

6. The system of claim 1 where said detector further provides light.

7. The system of claim 1 wherein said cable is delivered under an angle from said helicopter.

8. The system of claim 1 wherein said sensors further measure wind, temperature, humidity, precipitation, or visability.

9. The system of claim 1 wherein said motor slows down as the person or object approaches the target area and comes to a complete stop about two feet from the desired landing location within the target area.

10. The system of claim 1 wherein said display is attached at the top of an exit opening of the helicopter.

11. The system of claim 1 further comprising remote activation means for said motor.

12. The system of claim 1 further comprising an alarm indicating a system malfunction.

13. An improved rappelling system for raising or lowering a person or an object to or from a stationary or moving elevated point comprising:
   at least one cable for supporting a person or an object;
   a motor attached to said elevated point and coupled to said cable so that said motor propels said cable up or down and thereby raises or lower said person or object, respectively;
   a controller for controlling the motion of said motor;
   at least one sensor attached to said elevated point and coupled to said controller, wherein said sensor measures the distance of said elevated point from a target area located at a lower point than said elevated point and continuously sends a feedback signal to said controller and wherein said feedback signal comprises said measured distance and is used to calculate and adjust in real-time motor control parameters that determine speed and landing location of said person or object relative to said target area;
   a display attached to said elevated point and coupled to said controller for displaying said measured distance and calculated motor control parameters in real-time; and
   wherein said target area comprises a water surface of a water body and wherein said sensor further measures the distance of said elevated point to said water surface and the depth of the water body.

14. An improved rappelling method for raising or lowering a person or an object to or from a stationary or moving elevated point comprising:
   supporting a person or an object upon at least one cable;
   attaching a motor to said elevated point and coupling it to said cable so that said motor propels said cable up or down and thereby raises or lowers said person or object, respectively;
   controlling the motion of said motor with a controller;
   attaching at least one sensor to said elevated point and coupling it to said controller;
   measuring the distance of said elevated point from a target area located at a lower point than said elevated point with said sensor, wherein said target area comprises a water surface of a water body and wherein said method further comprises measuring the distance of said elevated point to said water surface and the depth of the water body with said sensor;
   sending a feedback signal from said sensor to said controller, said feedback signal comprising said measured distance and using said feedback signal to calculate and adjust in real-time motor control parameters that determine speed, and landing location of said person or object relative to said target area;
   attaching a display to said elevated point and coupling it to said controller; and
   displaying said measured distance and said calculate motor control parameters in real-time in said display.

15. The method of claim 14 wherein said cable comprises a foot stirrup and wherein said foot stirrup is controlled by a self adjusting mechanism that grasps a person's foot upon applying pressure and releases the person's foot upon removing the applied pressure.

16. The method of claim 15 wherein said cable further comprises a hand loop and first and second handles located about five feet above said foot stirrup.

17. The method of claim 14 wherein said cable comprises heat resistant fibers and wherein said heat resistant fibers comprise Kevlar™ material, metal, composites, nano-materials, phase change materials or bullet proof materials.

18. The method of claim 14 wherein said cable comprises a structure allowing cable motion only on an X-Y plane defined by a longitudinal cable axis and a horizontal target axis and preventing motion on the corresponding X-Z and Y-Z planes that are perpendicular to the X-Y plane.

19. The method of claim 14 wherein said sensor further measures wind, temperature, humidity, precipitation, or visibility.

20. The method of claim 14 further comprising slowing down said motor as the person or object approaches the target area and bringing it to a complete stop about two feet from the desired landing location within the target area.

21. The method of claim 14 wherein said elevated point comprises a moving aircraft and wherein said display is attached at the top of an exit opening of the aircraft.

22. The method of claim 14 further comprising activating said motor remotely.

23. An improved rappelling method for raising or lowering a person or an object to or from a helicopter comprising:
   supporting a person or an object upon a single cable;
   attaching a motor to said helicopter and coupling it to said cable so that said motor propels said cable up or down and thereby raises or lowers said person or object, respectively;
   controlling the motion of said motor with a controller;
   attaching at least three sensors to three different locations of the helicopter, respectively, and coupling them to said controller;
   measuring the distances of the three different locations of the helicopter from three different locations in a target area located at a lower point than said helicopter with said sensors;
   sending feedback signals from said sensors to said controller, said feedback signals comprising said measured distances and using said feedback signals to generate a three-dimensional view of the target area and to calculate and adjust in real-time motor control parameters that determine speed, and landing location of said person or object relative to said target area;
   attaching a display to said helicopter and coupling it to said controller; and
   displaying said measured distances, said three-dimensional view of the target area and said calculated motor control parameters in real-time in said display.

* * * * *